Figure 1:
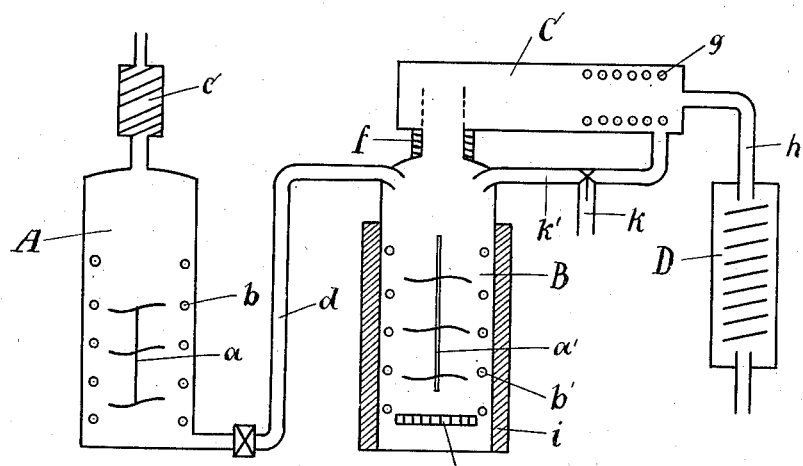

Oct. 5, 1937.     W. B. HEUSCHER     2,095,190
PROCESS FOR IMPROVING TARS
Filed Oct. 18, 1934

INVENTOR
Walter Bartholomäus Heuscher
BY
Bailey & Larson
ATTORNEYS

UNITED STATES PATENT OFFICE 2,095,190

PROCESS FOR IMPROVING TARS

Walter Bartholomäus Heuscher, Basel, Switzerland, assignor to the firm of Lonza Elektrizitatswerke und Chemische Fabriken Aktiengesellschaft, Basel, Switzerland, a corporation of Switzerland Application October 18, 1934, Serial No. 748,926
In Germany October 19, 1933

4 Claims. (Cl. 196—76)

The invention relates to the improvement of tars, particularly to the conversion thereof into high quality binders suitable for road-making, for sealing and insulating purposes, for painting purposes, for the manufacture of composition roofings and the like.

It is already known to add thickening agents, such as for example bitumen, asphalt, condensation products such as phenol-aldehyde condensation products, to tars or to produce such condensation products in situ in the tar itself after adding aldehydes and condensation agents, by heating. It is further known to thicken tars with oxidizing agents, for example by passing air over, or through, the same at elevated temperatures.

According to the present invention tars, such as for example coal-tars, which contain thickening agents are subjected to an oxidizing treatment at elevated temperatures, for example by passing air or other oxidizing gases or vapours through the tar whilst mixing the same, the operation being carried out in such a way that the lighter tar oils are distilled off and the middle and heavy oils are retained in the reaction mass or returned to the same, whilst the mass is stirred up during the whole treatment.

The invention is based on the double discovery that the middle and heavy oils, which according to the invention are retained in, or returned to, the reaction mixture during the oxidizing treatment, in part participate in the reactions taking place and considerably improve the properties of the end product, whilst the light oils, if retained in, or returned to, the reaction mass, have a detrimental effect, in that they inter alia counteract the polymerization of the unsaturated hydrocarbons and unfavourably influence the properties of the end product by delaying or preventing the thickening of the resins. The retention in, or return to, the reaction mass of the middle and heavy oils is attended inter alia with the advantage, that products of improved plastic properties are obtained and that the detrimental tendency of thickened tar products to become brittle is to a very great extent, or practically completely, repressed. In addition there is the economical-advantage that the middle and heavy oils, which can only be utilized as such with relative difficulty, find useful application, whilst the high quality, easily utilizable light oils are recovered.

Various thickening agents can be employed for this tar treatment, but it is important, especially for preparing products for road making, that they are possibly cheap. Such thickening products are for example bituminous or asphalt-like products, artificial or natural resins such as cumarone, colophony condensation products such as amin-aldehyde-resins, resinous by-products obtained in the manufacture of synthetic resins, perfumes and scents. The thickening products can be added to the tar before or after distilling off the light oils, preferably before the oxidizing treatment. They can also be produced by condensation reactions (effected) in the tar itself by adding condensing agents or products, such as for example by the alkaline condensation of the phenols contained in the tar with aldehydes.

Acetaldehyde and equivalent aldehydes, such as furfurol, crotonaldehyde or benzaldehyde are particularly suitable for the production of the phenol-aldehyde condensation products. Aldehyde mixtures, particularly those which contain acetaldehyde as their substantial constituent may also be employed. Alkaline substances, such as ammonia, amines or, if desired, mixtures thereof may be employed as condensation agents (catalysts).

The alkaline condensation process is suitably carried out at temperatures not exceeding 100° C., preferably at temperatures of about 70° C.

The oxidizing treatment can be effected during or after the light oils are distilled off. It may, for example, be carried out in such a way that the material, after carrying out the condensation process or adding thickening products, is brought to, for example, 150–210° C. by gradually raising the temperature, and subjected for some time within this temperature range to the action of the oxidizing agent. During this treatment the light oils are distilled off and the middle and heavy oils are returned in the mass. It is essential to effect the treatment by thoroughly stirring up the material, in order to ensure that the light oils distil over as completely as possible and to provide the oxidizing agent as complete access as possible to all parts of the tar mass.

The process according to this invention may, for example, be carried into effect by bringing the tar mass, after adding thickening products or after completion of the condensation process, to temperatures at which the lighter oils, such as benzene, xylene, toluene-containing oils, the products known as solvent naphtha and the like, distil over, and maintaining the mass at these temperatures, whilst subjecting the same to stirring, rotating or the like procedures, until the light oils have been expelled. This expulsion takes place in general at vapour temperatures, up to 120°, 130° or 140° C. The vapours distilling over are recovered by condensation. After the light oils have been expelled, the mass is brought to the temperature, particularly suitable for the oxidizing treatment, for example 160-170° C. and subjected at this temperature with stirring to the action of the oxidizing agent. The middle and heavy oils, which according to the invention are to be retained in the tar mass, can be prevented from distilling over in a very simple manner by employing a reflux condenser when the temperature range, at which these oils would otherwise distil over, is reached. An alternative procedure is to return to the process the whole, or any desired amount, of the middle and heavy oils distilled over.

The oxidizing treatment of the tar mass, for example by blowing in air, may also be commenced during the period in which the light oils distil over. It is, however, advisable first to heat the mass alone to the desired oxidizing temperature, in such a way that the light oil vapours distil over to a large extent, for example at vapour temperatures of 120-140° C., whilst the mass is being thoroughly stirred and only to commence the introduction of the oxidizing agent at this, or even a later, stage, for example when the actual oxidizing temperature, for example 150-170° C. has been reached.

Alternatively the introduction of the oxidizing agent may be commenced whilst the process of condensation is still proceeding.

The process according to the invention may, for example, be carried out by adding suitable quantities of acetaldehyde and ammonia to the tar under treatment, for example coal tar, which contains sufficient phenols, or to which phenols have, if necessary, been added, heating the mass, if desired with stirring, to temperatures not exceeding 100° C., for example temperatures of about 70° C. and maintaining the material for a few hours at this temperature until the condensation process is complete. A dephlegmator prevents the volatile condensing agents, as acetaldehyde and ammonia, to escape. Towards the end or after completion of the condensation process, the tar mass is gradually brought to a temperature of about 98-100° C., at which temperature a mixture of water and certain light oils distils over. After the main quantity of water has distilled over, the temperature of the mass is allowed gradually to rise until the vapour temperatures, constituting the limit for the distillation of the light oils, for example vapour temperatures of about 130-140° C., are reached. During this period the light oils are expelled, constant stirring of the mass being effected in order to facilitate the expulsion. The light oils expelled thereby and recovered by condensation, when employing coal tar, amount in general to about 7-8% of the weight of the tar employed. The quantity of light oil distilled over obviously depends on the fraction of light oils contained in the coal tar employed. The mass is then brought under reflux to the temperature suitable for carrying out the main oxidizing process, preferably to 160-170° C. and maintained at this temperature with further introduction of air and constant mixing until the desired consistency is reached.

During the course of the oxidizing process, the viscosity of the product constantly increases. When employing elevated temperatures, for example 170° C. and above, the oxidizing process must, however, not be extended too far, since it has been found that, when exceeding a certain degree of viscosity, products are obtained, which possess a considerable tendency to turn brittle and consequently are not well adapted for certain purposes, for example for use as road tar, since in time they lose their plasticity and binding power. Products, which possess at least 100 times, preferably 150-200 times, the viscosity of the crude tar employed may, for example, be obtained. It has in general proved to be advisable, when working up coal tars to products for road construction purposes, not to increase the viscosity of the product over 300 secs. (measured at 30° C. in a road tar viscosimeter—see "Wie prüft man Strassenbaustoffe" by Bierhalter, Berlin, 1932), since otherwise products tending to become prematurely brittle may be produced.

It has further to be taken into account that in certain cases, for example for the surface treatment of roads or in the production of macadam, the tar products are subjected to a further treatment comprising a more or less protracted heating in a heating vessel, whereby a further increase in the viscosity takes place, particularly when heating for a relatively long time. It is advisable, therefore, for such purposes to prepare products of such viscosity that they are not detrimentally influenced by heating at the place of application.

According to this invention it has been found that the presence of relatively large quantities of water in the crude tar, for example quantities of more than 3%, may have a detrimental influence on the process. It is advisable, therefore, in the case of tars containing relatively large quantities of water to remove the disturbing water content before adding the aldehyde. Partial or practically complete removal of the water may be effected by subjecting the tar to a preliminary distillation. In this case certain quantities of light oils distilling over with the water may be removed at the same time. It has to be taken into account that water is formed by the condensation process and that water may be introduced into the process, for example by the addition of aqueous ammonia solution. It is, however, also possible to reduce the quantity of water by condensing the ammonia with aldehyde to aldehyde-ammonia and introducing the ammonia in this form into the process.

It has further been found, that in many cases, especially when tars are used which are rich in oxygen containing and nitrogen containing components, part of these valuable components can be extracted before the treatment of the tar and still it is possible to obtain much improved tars by following the treatment described below.

The valuable oxygen containing components, such as phenols, for example carbolic acid, naphthalenes and others and the nitrogen containing components, such as bases, for example pyridine and others, can be extracted from the tars and, after treatment, be used for suitable purposes.

The tars, from which those components were extracted, are subjected to an oxidizing treatment at a raised temperature by preceding formation or addition of thickening products. In the cases of adding aldehydes, the condensation products are formed through the higher and less valuable oxidized components, such as xylenole and others.

According to this alternative, the tars, preferably such rich in phenols or tars of low temperature are treated for example in the following manner: First the light, middle and part of the heavy oils are distilled off. From these oils the phenols or the phenol like bodies can be extracted wholly or partly with known methods, such as for example by treating with alkali. The remaining oils (for example those without phenols) are then returned wholly or partly into the tar. Preferably the light oils are not returned into the tar, on account that they are distilled off from the tar in either case during the following oxidizing and thermic treatment.

The tar thus arrived at, is then subjected, as described before, after incorporating thickening products, to an oxidizing treatment at elevated temperature whereby, while stirring up, the lighter oils being distilled off and the middle and heavy oils being retained or returned in the reaction mass.

The improved tar obtained is characterized by the absence of light oils, i. e. such oils which in the normal boiling analysis (for example according to Schläpfer) boil at temperatures up to 170° C. and by an unusually high content of middle (170–230° C.), heavy (230–270° C.) and anthracene oils (270–350° C.) i. e. such oils which together distill over between 170 and 350° C. Their content amounts to about 30 to 40%. The quantity and the proportion of these oils in the finished improved tar vary according to the kind of the raw tar used and the manner of treatment. Naturally, for example, from a tar which is poor in middle oils one will also obtain an improved tar poor with respect to such oils. The fact that the present products in spite of their high content of oils (30–40%) show the desired high viscosity of 100 to 300 seconds is an entirely new and striking feature and characteristic for the present process. The high viscosity causes a rapid setting of the tar in road building and allows conducting traffic over the tar very soon. The high content of higher boiling oils warrants high plasticity and counteracts the tendency to turn brittle.

Figure 2:
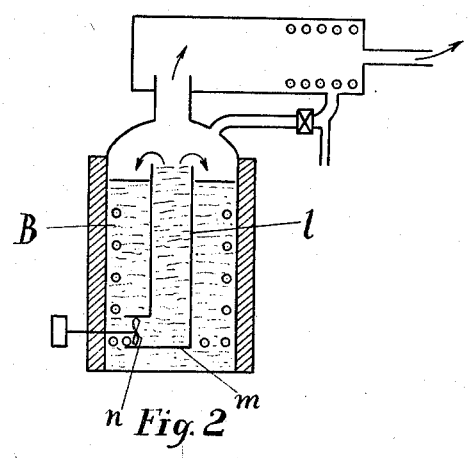

The invention is illustrated by way of example in the accompanying diagrammatic drawing, in which Figure 1 illustrates a suitable form of apparatus for carrying out the process according to this invention, and Figure 2 illustrates a suitable form of oxidizing vessel.

Referring to Figure 1, the apparatus consists of the condensation vessel A and the oxidizing vessel B. When the thickening products are added to the tar, the whole treatment can be effected in the vessel B, whereas when the thickening products are produced in the tar itself by condensing reactions, it is preferably to effect the condensation in the vessel A and the following oxidizing treatment in the vessel B. The condensation vessel A is provided with a stirrer $a$, a heating coil $b$ and a reflux condenser $c$ and is connected to the oxidizing vessel B by means of a closable conduit $d$. The lower part of the oxidizing vessel B, which is likewise provided with a stirrer $a'$ and a heating coil $b'$ and is preferably provided with heat-insulating walls $i$, possesses a member $e$ for the introduction of the oxidizing agent such as air, whilst the upper end thereof is constructed in the form of, or provided with, a reflux condenser $f$, which discharges into a space C. The space C in the embodiment shown is constructed in the shape of a box and provided with a coil $g$, through which cooling water or steam may be passed. The cooling space C is connected by conduit $h$ with the condensing coil D for the light oils.

The method of operating with the aid of the above described apparatus is as follows: the digestion of the tar with aldehyde with the formation of phenol-aldehyde resins is carried out at suitable temperatures, for example temperatures of about 70° C., in the vessel A, preferably constructed without heat insulation. After the completion of this process, the hot mass is transferred to the oxidizing vessel B and there brought with thorough mixing to the temperature necessary for expelling the water and light oils, air being, if desired, passed through the mixture. The steam and light oil vapours produced pass through the tube-shaped upper portion $f$ of the vessel B into the chamber C and from the latter into the condensing coil D. The cooling space C is adjusted to a temperature, at which the crude naphthalene passing over with the water vapour and light oils is separated out, whilst the light oils themselves pass into the condensing coil D and are there condensed. The rate of flow of the vapours passing through the space C is so regulated that the entire crude naphthalene is separated out in the chamber C. The crude naphthalene separated out in the chamber C may be liquefied by passing steam through the coil $g$ and be withdrawn through the conduit $k$ or be returned to the oxidizing vessel B through the conduit $k'$. The crude naphthalene is preferably only returned to the oxidizing space when the water has been entirely or to a considerable extent vaporized, in order as far as possible to prevent the naphthalene from being again distilled over with the discharging steam.

After the water and the light oils present in the mass have been expelled, the temperature in the oxidizing vessel B is raised to a temperature, suitable for carrying out the oxidizing process, for example 160–170° C., and the oxidizing process is carried out with further stirring of the mass and passing air through until the desired consistency is reached. Distilling off or expelling of the middle and heavy oils, which are to be retained in the tar mass according to the invention, is prevented by the reflux condenser $f$.

The condensing and oxidizing treatment could also be carried out in one vessel alone, but the efficiency of the plant is increased by the subdivision of the apparatus into a condensing vessel and a heat-insulated oxidizing vessel, and in addition the advantage is obtained that, on discharging the finished product from the oxidizing vessel, the heat stored therein is not lost, but is employed for heating up the new charge introduced from the condensation vessel to the distillation temperature. A further advantage consists in the fact, that the non-insulated condensation vessel, after being discharged, can be cooled in a very short time to the initial temperature, for example 20° C., suitable for the reception of a fresh charge. The insertion of the intermediate cooling space C between the oxidizing vessel B and the condensing coil D offers the advantage of easy separation of crude naphthalene and light oil and assures the avoidance of pipe stoppages caused by the presence of crude naphthalene.

Referring to Figure 2 of the drawing, the tar mass in the oxidizing vessel B is maintained in constant circulation during the distilling and oxidizing processes. The oxidizing vessel B is provided with a preferably centrally disposed cylinder $l$, into the lower part of which a pipe $n$ discharges, in which a conveying device $n$ is provided, which operates in such a way that it introduces the tar mass into the cylinder $l$ and forces it from below upwards through the cylinder. The hot mass discharging from the upper portion of the cylinder $l$ spreads out on all sides and flows into the annular space surrounding the cylinder $l$ and thus presents a large surface to the ascending oxidizing gases. The oxidizing air in this embodiment is introduced into the lower portion of the oxidizing vessel B, in such a way that it flows in a state of uniform distribution through the annular space filled by the hot mass of tar in countercurrent to the direction of flow of the tar, whereby, in particular, the oxidizing air is given the opportunity of exerting an intensive action upon the material discharging and spreading out on all sides from the upper portion of the cylinder $l$. The oxidizing vessel illustrated in Figure 2 enables the light oils to be practically completely expelled and the oxidizing process to be carried out very efficiently and uniformly.

Local overheating of the tar in the heating pipes which, as is known, leads to undesirable cracking of the tar, is also avoided by the rapid rotation of the tar mass mentioned above.

The process according to this invention allows tars to be converted into products of high viscosity, which have excellent plastic and binding properties and possess the advantage that they do not become brittle prematurely. Due to their admirable properties, the products prepared according to the invention, are particularly suitable for road making, insulating purposes and the like.

The products may also with advantage be converted into so-called cold tar and be used as such. This may, for example, be effected by incorporating with the products suitable quantities of easily volatile solvents or diluents, such as benzene, low boiling forerunnings from the tar and petroleum industries and the like.

The viscosity of the treated products may be increased by the addition of bituminous substances, such as asphalts.

*Examples*

1. 15 gms. of acetaldehyde and 7.5 gms. of aqueous ammonia (sp. gr. 0.91) are gradually added while stirring to 500 gms. of a thinly liquid vertical chamber furnace tar containing 5% of light and middle oils, 12% of heavy oils, 4–5% of phenols and phenolic substances and 5.9% of water (viscosity at 30° C. measured in a tar viscosimeter 1.2 secs.) in a closed vessel provided with a dephlegmator. The mass is then heated, for example within one hour to about 70° C. and maintained at this temperature for about 7 hours, after which a uniform current of air, for example 3500 ccs. per hour, is passed into the mass and the temperature slowly raised, for example within 4 hours to 110° C. and within about 5 more hours to 160° C. The vapours distilling off are cooled and intercepted in a receiver. The mass is then maintained for about 10 hours at 160–170° C. with constant stirring and further introduction of air. The vapours evolved are condensed by reflux cooling and returned to the reaction mass. The resulting product is tough, viscous, very tacky, possesses satisfactory adhesive properties and sets rapidly in a rubble test. It contains no light oils and about 34% oils distilling between 170–350° C. Its viscosity (measured in a tar viscosimeter) amounts at 30° C. to about 245 secs. As distillate there were obtained: 5.1% of water and 4.1% of oil, calculated on the charge. The oil had the following properties: sp. gr. 0.933 at 20° C. and refractive index 1.509 at 20° C.

2. In a closed noninsulated vessel provided with a reflux condenser 105 kgms. of concentrated aqueous ammonia solution (25%) are slowly added to 7000 kgms. of pre-distilled gas tar containing about 0.6 percent of water by weight, 1% of light oils, 14.2% of middle oils (170–230° C.), 10.3% of heavy oils (230–270° C.), 23.7% of anthracene-oils (270–350°). Then about 245 kgms. of acetaldehyde are slowly added. Within about 2 hours the temperature is thereafter raised with constant stirring to about 70° C. and the mass thereafter maintained at this temperature for 7 hours more. The mass is then passed into the oxidizing vessel (see B in the drawing) and brought to about 98° C. within about 1 hour. At this temperature the major portion of the water distills off with some light oil. After about 1½ hours, when the quantity of distillate passing over in a given time, decreases, the mass is brought within 2 hours to 160° C., the temperature of the vapours passing over and collected separately gradually increasing from 98 to 126° C. The blowing in of air is commenced at this temperature and the temperature raised to 160° C. When this temperature has been reached the oxidizing process is continued under a reflux condenser for about 10–12 hours, until a tough, viscous product, having satisfactory adhesive and binding powers is obtained. Its viscosity is of about 113 secs. at 30° C. (road tar viscosimeter), and it contains about 37.3% oils distilling between 170–350° (8% between 170–230°, 10% between 230–270°, 19.3% between 270–350° C.). The amount of air blown in amounts to 42 cubic metres per hour.

3. 15000 kgms. coal tar rich in phenols and which have preferably been freed from water, are subjected to distillation in a tar-retort at slow pressure. The first fraction distilling up to 170–180° C. (760 mm.) or up to a specific gravity of 0.96 are the light oils, which are worked up in the benzole plant to benzole, toluol, xylol, and pyridine. The second fraction of the middle oils is distilled up to a specific gravity of 1.00–1.02 and contains neutral oils, phenols and bases. In this point the distillation is stopped. The middle oils are separated in known manner by fractional distillation in solvent benzole II and in phenol oils, which contains about 30–45% of phenol like bodies.

The phenol oils are treated with caustic soda solution of the specific gravity 1.1. The aqueous solution of the sodium phosphate is treated with $CO_2$ and then distilled in three fractions: crystallized phenol, technical cresol and technical xylenols.

The neutral and basic-fractions of the phenol oils (solvent benzol II) and the technical xylenols are returned in the tar. Then 225 kgms. of ammonia (25%) and after half an hour 450 kgms. of acetaldehyde are added to the tar cooled to 20° C. The mass is then heated and oxidized as in Example 1.

4. 500 gms. tar are heated to about 140–150° (I) in a closed vessel, the mass being stirred up and the light oils being distilled off and collected separately. When the distillation begins to diminish, there are added to the tar 30 gms. of bitumen with a softening point of about 70° C. Then the mass is brought after inserting a reflux condenser to a temperature of about 160–170° (II) and treated at this temperature while stirring and introducing air in a fine subdivision (about 30 min. to one hour) till it has reached a viscosity of about 200 sec. which will take a time of 15–25 hours according to the quality of the tar.

In the same way the tar can be treated after adding it to resin like by-products or cumarone resins. To obtain a viscosity of about 300° secs., the first temperature (I) can be raised to about 179–180° C. and the oxidizing temperature (II) to about 190–200° C.

To improve the qualities of the finished tar products, there can be added to in known manner so-called filling-agents, that are very fine pulverized mineral substances or coal.

The expression "oxygen and nitrogen containing components" as used in the specification is intended to mean substances which normally occur in crude tar, and particularly in coal tar, and which have a content of oxygen or nitrogen, such as phenol or various types of phenols, naphthaline, pyridine gases and the like.

The expression "thickening agents" as used in the specification and claims is intended to cover all substances which are useful for increasing the viscosity of tar, such as for instance bituminous or asphalt-like products, natural or synthetic resins, such as cumarone resins, colophony, phenol and aldehyde condensation products, such as acetaldehyde and furfurol, resinous condensation products, resinous by-products such as are obtained in the production of synthetic resins and odorous substances, and the like.

The expression "condensation catalysts" is intended to cover substances suitable for catalytically accelerating the condensation of aldehydes with phenols, as for instance ammonia, organic amines or mixtures of such substances.

What I claim is:

1. A process for converting tar into a highly viscous yet not solid mass having no tendency to become brittle, which comprises the steps of subjecting a tar to a condensing treatment with an aldehyde at temperatures not exceeding about 100° C., thereafter bringing the mass to oxidizing temperatures while distilling off the light oils, thereafter subjecting the mass to an oxidizing treatment while stirring by passing air therethrough at temperatures of about 150° C.–210° C., until a viscosity of 100 to 300 seconds measured at 30° C. in a road tar viscosimeter has been attained, and returning to the mass the middle and heavy oils which distill off during the oxidizing treatment with a reflux condenser.

2. A process for converting tar into a highly viscous yet not solid mass having no tendency to become brittle, which comprises the steps of subjecting a phenol containing tar with the addition of acetaldehyde and ammonia to a condensing treatment with an aldehyde at temperatures not exceeding about 100° C., thereafter bringing the mass to oxidizing temperatures while distilling off the light oils, thereafter subjecting the mass to an oxidizing treatment while stirring by passing air therethrough at temperatures of about 160° C.–170° C., until a viscosity of 100 to 300 seconds measured at 30° C. in a road tar viscosimeter has been attained, and returning to the mass the middle and heavy oils which distill off during the oxidizing treatment with a reflux condenser.

3. A process according to claim 1, wherein the naphthalene passing over with the light oils is separated before condensing the light oils and returned to the tar.

4. A process according to claim 1, in which the condensation step is carried out with aldehydes and ammonia in a separate vessel, and the hot mass so obtained is transferred to another vessel in which the mass is freed from light oils and subjected to oxidation by passing air through it.

WALTER BARTHOLOMÄUS HEUSCHER.